(12) United States Patent
Oowaku et al.

(10) Patent No.: US 10,801,220 B2
(45) Date of Patent: Oct. 13, 2020

(54) GONDOLA APPARATUS

(71) Applicant: NISSO INDUSTRIES CO., LTD., Tokyo (JP)

(72) Inventors: Tadamasa Oowaku, Tokyo (JP); Jun Hiruma, Tokyo (JP)

(73) Assignee: NISSO INDUSTRIES CO., LTD., Tokyo (JP)

( * ) Notice: Subject to any disclaimer, the term of this patent is extended or adjusted under 35 U.S.C. 154(b) by 154 days.

(21) Appl. No.: 16/064,249

(22) PCT Filed: Dec. 9, 2016

(86) PCT No.: PCT/JP2016/086745
§ 371 (c)(1),
(2) Date: Jun. 20, 2018

(87) PCT Pub. No.: WO2017/122475
PCT Pub. Date: Jul. 20, 2017

(65) Prior Publication Data
US 2019/0010714 A1 Jan. 10, 2019

(30) Foreign Application Priority Data

Jan. 15, 2016 (JP) .................................. 2016-005808

(51) Int. Cl.
*E04G 3/30* (2006.01)
*F03D 80/50* (2016.01)
(Continued)

(52) U.S. Cl.
CPC ............... *E04G 3/30* (2013.01); *E04G 3/325* (2013.01); *F03D 80/50* (2016.05); *E04G 5/14* (2013.01);
(Continued)

(58) Field of Classification Search
CPC ................ F03D 80/50; F05B 2240/221; F05B 2240/912; E04G 3/30; E04G 3/32;
(Continued)

(56) References Cited

U.S. PATENT DOCUMENTS

| | | | | |
|---|---|---|---|---|
| 4,424,884 A | * | 1/1984 | Smith, Jr. ................ | A62B 1/02 182/12 |
| 4,602,698 A | * | 7/1986 | Grant .................... | A01M 31/02 182/142 |

(Continued)

FOREIGN PATENT DOCUMENTS

| | | | | |
|---|---|---|---|---|
| DE | 10318675 A1 | * | 11/2004 | ............. F03D 80/50 |
| EP | 1516846 A2 | | 3/2005 | |

(Continued)

OTHER PUBLICATIONS

Jun. 28, 2019, Canadian Office Action issued for related CA Application No. 3,011,212.

(Continued)

*Primary Examiner* — Katherine W Mitchell
*Assistant Examiner* — Shiref M Mekhaeil
(74) *Attorney, Agent, or Firm* — Paratus Law Group, PLLC

(57) ABSTRACT

There is provided a gondola apparatus including: a horizontal front scaffold frame facing a back of a blade; first and second side scaffold frames each horizontally movably attached to the front scaffold frame; a stabilizing member attached over both sides of the front scaffold frame such that the stabilizing member is extendable and contractable, the stabilizing member abutting on an outer surface of a tower; a first lifting device provided to the front scaffold frame; second and third lifting devices attached to the first and second side scaffold frames, respectively, such that the second and third lifting devices are rockable; first and (Continued)

second drive devices provided to the front scaffold frame, the first and second drive devices being configured to horizontally drive the first and second side scaffold frames, respectively; and first, second, third traction ropes provided between the first, second, and third lifting devices, and an origin on a side of a nacelle, respectively.

7 Claims, 11 Drawing Sheets

(51) Int. Cl.
 *E04G 3/32* (2006.01)
 *E04G 5/14* (2006.01)
 *E04G 3/28* (2006.01)
(52) U.S. Cl.
 CPC .. *E04G 2003/283* (2013.01); *E04G 2003/286* (2013.01); *F05B 2240/221* (2013.01); *F05B 2240/912* (2013.01)
(58) Field of Classification Search
 CPC .......... E04G 3/325; E04G 3/305; E04G 5/14; E04G 2003/283; E04G 2003/286
 See application file for complete search history.

(56) References Cited

U.S. PATENT DOCUMENTS

| | | | | |
|---|---|---|---|---|
| 8,013,619 | B2* | 9/2011 | Olson | G01R 31/026 324/72 |
| 8,083,029 | B2* | 12/2011 | Teichert | E04G 3/30 182/128 |
| 8,397,382 | B2* | 3/2013 | Anasis | B23P 6/002 29/889.1 |
| 8,490,749 | B2* | 7/2013 | Teichert | E04G 3/30 182/187 |
| 8,578,604 | B2* | 11/2013 | Malaschewski | E04G 3/30 29/889.1 |
| 8,641,374 | B2* | 2/2014 | Byreddy | B08B 1/00 415/232 |
| 9,410,331 | B2* | 8/2016 | King | E04G 3/325 |
| 9,624,901 | B2* | 4/2017 | Gunther | F03D 80/50 |
| 10,443,580 | B2* | 10/2019 | Hansen | F03D 13/20 |
| 10,487,806 | B2* | 11/2019 | Huot | E04G 3/243 |
| 2004/0168854 | A1* | 9/2004 | Azran | E04F 21/08 182/141 |
| 2005/0042102 | A1* | 2/2005 | Teichert | B08B 1/04 416/146 R |
| 2006/0175465 | A1* | 8/2006 | Teichert | B66C 23/207 244/33 |
| 2007/0007074 | A1* | 1/2007 | Lemburg | E04G 3/30 182/128 |
| 2007/0056801 | A1* | 3/2007 | Iversen | F03D 80/50 182/141 |
| 2007/0231076 | A1* | 10/2007 | Khachaturian | B63C 3/06 405/204 |
| 2010/0290918 | A1* | 11/2010 | Pedersen | B66C 3/00 416/245 R |
| 2011/0024233 | A1* | 2/2011 | Lott | F03D 80/55 182/129 |
| 2011/0127109 | A1* | 6/2011 | Teichert | F03D 80/50 182/19 |
| 2011/0138937 | A1* | 6/2011 | Fritz | G01M 11/081 73/865.8 |
| 2011/0303488 | A1* | 12/2011 | Besselink | B66F 11/04 182/142 |
| 2011/0318496 | A1* | 12/2011 | Jensen | F03D 80/55 427/427.3 |
| 2012/0168252 | A1* | 7/2012 | Bogaert | E04G 3/325 182/142 |
| 2014/0054110 | A1* | 2/2014 | Fernandez Gomez | E04G 3/30 182/19 |
| 2015/0090504 | A1* | 4/2015 | Bagheri | E04G 3/243 180/7.1 |
| 2015/0232307 | A1* | 8/2015 | Holloway | B66C 1/108 414/800 |
| 2017/0096823 | A1* | 4/2017 | Apostolopoulos | E04G 1/152 |
| 2019/0031474 | A1* | 1/2019 | Stilborn | B66C 13/18 |
| 2019/0072078 | A1* | 3/2019 | Munk-Hansen | F03D 80/88 |
| 2019/0177988 | A1* | 6/2019 | Halberg | E04G 3/32 |

FOREIGN PATENT DOCUMENTS

| | | |
|---|---|---|
| JP | 2004-293455 A | 10/2004 |
| JP | 2012-007525 A | 1/2012 |
| JP | 2014-025326 A | 2/2014 |
| KR | 10-1496226 B1 | 2/2015 |

OTHER PUBLICATIONS

Tractel Group, Wind Turbine Product Solutions, G 1019 (Wind Turbine Brochure)_GB.indd, 2012, pp. 3, 5, 7, 9, 11, 13, 15, 18, 20, and 22, Tractel Group.

* cited by examiner (A)

(B)

(C)

(A)

(B)

GONDOLA APPARATUS

CROSS REFERENCE TO PRIOR APPLICATION

This application is a National Stage Patent Application of PCT International Patent Application No. PCT/JP2016/086745 (filed on Dec. 9, 2016) under 35 U.S.C. § 371, which claims priority to Japanese Patent Application No. 2016-005808 (filed on Jan. 15, 2016), which are all hereby incorporated by reference in their entirety.

TECHNICAL FIELD

The present invention relates to a gondola apparatus suitable for maintenance of the blades of an aerogenerator.

BACKGROUND ART

This type of aerogenerator includes a columnar tower, a nacelle mounted on the tower, and blades provided to the nacelle, and rotates the blades to operate a generator.

The blades each have the paint on an outer surface peel off or deteriorate due to exposure to wind pressure, lightning strikes, or ultraviolet rays after several years of construction, and thus not only the blades do not function but also external appearance is unfavorable.

Thus, the blades need maintenance, such as outer surface painting or repairing. Therefore, gondola apparatuses for the maintenance have been developed as disclosed in JP 2004-293455 A and JP 2012-7525 A.

The gondola apparatus described in JP 2004-293455 A, raises or lowers a gondola attached along a guide rail angularly adjustable with a cylinder on the outer surface of a tower, to a work position for a blade, through a wire rope suspended from the side of a nacelle.

Similarly, the gondola apparatus for the maintenance described in JP 2012-7525 A, raises or lowers a workbench attached to a rack rail on the outer surface of a tower, to a work position for a blade, through a suspended wire suspended from a nacelle.

However, for each of the conventional gondola apparatuses for the maintenance, the guide or the rack rail is provided to the tower and then the gondola is attached to the guide or the rack rail. Thus, each apparatus is massive and has an intricate structure. Each apparatus is difficult to assemble or remove, and has disadvantages in processability, economic efficiency, and workability.

Therefore, a gondola apparatus for blade maintenance that raises or lowers a gondola with only lifters and traction ropes has been developed. For example, a gondola apparatus 100 illustrated in FIGS. 11 and 12, includes: laterally paired platforms 102 and 103 that ascend or descend along the outer surface of a tower 101; laterally paired hoist trapezoidal supports 104 and 105 erecting on both sides of the platforms 102 and 103; laterally paired parallelogram parallel frames 106 provided to the upper centers of the supports 104 and 105; laterally paired traction ropes 108 wound on lifters 107 provided to the centers of the parallel frames 106 and 106, the laterally paired traction ropes 108 being suspended from a nacelle 101A; paired wires 109 and 110 adjustable in length disposed between each of the hoist trapezoidal supports 104 and 105 and both sides of the parallel frame 106; laterally paired support frames 112 extendable and contractable provided to lower portions of the lateral platforms 102 and 103; and a presser roller 113 provided at an end portion of each of the support frames 112, the presser roller 113 abutting on the outer surface of the tower 101.

As illustrated in FIG. 12, the gondola apparatus 100 is suspended with the two traction ropes 108 and 108 to have the lateral platforms 102 and 103 disposed on both sides of a blade 114, and additionally extends the presser frames 112 such that the stabilizing rollers 113 abut on the outer surface of the tower 101. Then, the gondola apparatus 100 drives the lifters 107 to raise or lower the lateral platforms 102 and 103 to a predetermined maintenance work position to the blade 114.

Then, as illustrated in FIG. 12, when the lateral platforms 102 and 103 ascend or descend to an arbitrary work position, the support frames 112 abuts on the tower 101 with a change in extending amount, in accordance with the raised or lowered position.

Therefore, the inclination angles of the traction ropes 108 vary every time the platforms 102 and 103 move left or right in FIG. 12. Simultaneously, the tension of the traction ropes 108 by the extension of the support frames 12 causes a clockwise moment to increase, and thus there is a risk that the gondola apparatus 100 clockwise inclines.

Therefore, the gondola apparatus illustrated in FIG. 11 causes, for example, an adjuster 111 to extend the one wire 110 and an adjuster 111 to contract the other wire 109 to change each of the angles of the parallel frames 106. Then, the angles of the traction ropes 108 are corrected, so that the gondola apparatus is prevented from inclining.

On the other hand, a gondola 200 illustrated in FIG. 13 includes: a horizontal work floor 201 extending in a direction crossing a tower 101; longitudinally paired lifters 202 provided to the work floor 201; props 203 erecting from the housings of the lifters 202; sheaves 204 provided to the upper portions of the props 203; longitudinally paired traction ropes 205 wound on the lifters 202 through the sheaves 204, the longitudinally paired traction ropes 205 being suspended from a nacelle 101A; a support frame 207 inserted into each pipe 206 provided on both sides of the work floor 201 such that the support frame 207 is extendable and contractable; a counterweight 208 provided at a leading end of the support frame 207; and a stabilizing roller 209 provided at a base end of the support frame 207, the stabilizing roller 209 abutting on the outer surface of the tower 101 such that the stabilizing roller 209 is rollable.

Then, the gondola 200 is suspended through the traction ropes 205 suspended from the nacelle 101A to have the work floor 201 disposed outside or inside a blade 114, and drives the lifters 202 to ascend or descend to a predetermined work position.

Then, for example, as illustrated in FIG. 14, when the gondola is disposed outside the blade 114, the support frames 207 are extended toward the tower 101 such that the rollers 209 abut on the tower 101. However, a clockwise moment increases by the extension of the support frames 207 and thus there is a risk that the work floor 201 clockwise inclines and has difficulty in remaining horizontally. Thus, the counterweights 208 are extended opposite to the support frame 207 to balance with the increased moment, so that the work floor 201 constantly remains horizontally.

However, since the conventional gondola apparatuses each ascend or descend through the traction ropes, the structure can be simplified in comparison to the gondola apparatuses described in Patent Literature 1 and Patent Literature 2. However, since the number of traction ropes is two, each gondola apparatus has difficulty in remaining horizontally. Thus, inconveniently, a correction unit is required to maintain the horizontality.

That is, the gondola apparatus 100 of FIG. 12 needs the parallelogram parallel frames 106 and the wires 109 and 110 adjustable in length on both sides of each of the parallelogram parallel frames 106, and thus has the structure intricate. The extending or contracting operation of the wires is required on each platform each time the horizontality is maintained, and thus the gondola apparatus 100 has disadvantages in processability, economic efficiency, and workability.

The gondola apparatus 200 illustrated in FIG. 14 has the counterweights 208 in order to remain horizontally, and thus has the structure intricate. The extending or contracting operation of each of the counterweights 208 is required each time the horizontality is maintained, and thus the gondola apparatus 200 has also disadvantages in processability, economic efficiency, and workability.

Furthermore, since the gondola apparatus 200 has the work floor disposed only outside or inside the blade 114, a work range to the blade 114 is limitative. In addition, for example, when the work floor is disposed on the outside, inconveniently, there is a risk that the traction ropes 205 obliquely cross the blade 114 to interfere with each other and then the blade 114 and the traction ropes 205 damage.

Therefore, another gondola apparatus that easily remains horizontally has been developed as illustrated in FIG. 15.

The gondola apparatus 300 includes: work floors 301, 302, and 303 having a U shape in plan view; a lifter 304 provided at a center of each of the work floors 301, 302, and 303; a prop 305 erecting from the housing of each lifter 304; a sheave 306 provided at the upper end of each prop 305; and three traction ropes 307 each wound on the lifter 304 through the sheave 306, the three traction ropes 307 being suspended from an origin on the side of a nacelle.

SUMMARY OF THE INVENTION

When the gondola apparatus 300 illustrated in FIG. 15 is suspended, as illustrated in FIG. 16, the work floors 301, 302, and 303 are each disposed at the circumference of a blade 114, so that a work area is large. Furthermore, since suspended through the three traction ropes 307 at the apexes of a triangle, the gondola apparatus 300 can remain horizontally at any position in ascending or descending. Thus, no redundant device that maintains the horizontality is required, so that the inconvenience of the gondola illustrated in FIG. 11 or FIG. 13 can be solved.

However, the gondola apparatus 300 has the U shape in plan view, and the blade 114 has a thick portion and a thin portion in sectional area and a teardrop shape when viewed in horizontal section. When the work floors 301, 302, and 303 are each disposed at the circumference of the blade 114 as illustrated in FIG. 16, the suspension with the traction ropes 307 from above cannot make the work floors 301, 302, and 303 close to each region, specifically, the thin portion. Therefore, an assist rope not illustrated is suspended from the gondola apparatus 300, and then the assist rope is operated on the ground to adjust the work position of each of the work floors 301, 302, and 303. Thus, the operation of the assist rope is inconvenient and there is a risk that safety lowers.

Since the work floors have the U shape, corners being the joints between the longitudinal work floor 301 and the lateral work floors 302 and 303, increase in floor area. When a worker comes to or a work tool is placed on each joint, each joint increases in weight and thus there is a risk that the gondola apparatus 300 overturns. Furthermore, one traction rope 307 bearing a load in the inclination direction at the center is overloaded and thus there is a risk that the durability thereof deteriorates. Therefore, it is desirable to solve the risks.

An object of the present invention is to provide a gondola apparatus for maintenance of blades in an aerogenerator, capable of solving the inconvenience of the conventional gondola apparatuses, with adoption of advantages of the conventional gondola apparatuses.

A first object of the present invention is to allow the entire gondola apparatus to easily remain horizontally; a second object is to require no redundant unit or work for maintaining the horizontality; a third object is to enable the position of a scaffold board to be adjusted in accordance with a thick portion and a thin portion of a blade in horizontally sectional view; and a fourth object is to improve the durability of one specific traction rope without overloading the rope.

In order to achieve the objects, according to the present invention, there is provided a gondola apparatus to be used for maintenance of a blade in an aerogenerator including a columnar tower, a nacelle provided on the tower, and the blade rotatably provided to the nacelle, the aerogenerator being configured to rotate the blade to operate a generator, the gondola apparatus including: a front scaffold frame horizontally extending in a direction crossing the tower, the front scaffold frame facing a back of the blade; a first side scaffold frame horizontally movably attached to the front scaffold frame, the first side scaffold frame facing a side surface of the blade; a second side scaffold frame horizontally movably attached to the front scaffold frame, the second side scaffold frame facing a side surface of the blade, the second side scaffold frame being paired with the first side scaffold frame; a stabilizing member attached over both sides of the front scaffold frame such that the stabilizing member is extendable and contractable, the stabilizing member abutting on an outer surface of the tower; a first lifting device provided to the front scaffold frame; a second lifting device provided to the first side scaffold frame such that the second lifting device is rockable; a third lifting device provided to the second side scaffold frame such that the third lifting device is rockable; a first drive device provided to the front scaffold frame, the first drive device being configured to horizontally drive the first side scaffold frame; a second drive device provided to the front scaffold frame, the second drive device being configured to horizontally drive the second side scaffold frame; a first traction rope provided between the first lifting device and an origin on a side of the nacelle; a second traction rope provided between the second lifting device and the origin on the side of the nacelle; and a third traction rope provided between the third lifting device and the origin on the side of the nacelle.

DESCRIPTION OF EMBODIMENTS

An embodiment of the present invention will be described below on the basis of the drawings. The present invention relates to a gondola apparatus A to be applied for maintenance of an aerogenerator including a columnar tower 1, a nacelle 2 mounted on the tower 1, blades 3 rotatably provided to the nacelle 2, as illustrated in FIG. 5, particularly, the gondola apparatus A being suitable for maintenance work of the blades 3.

Figure 5:
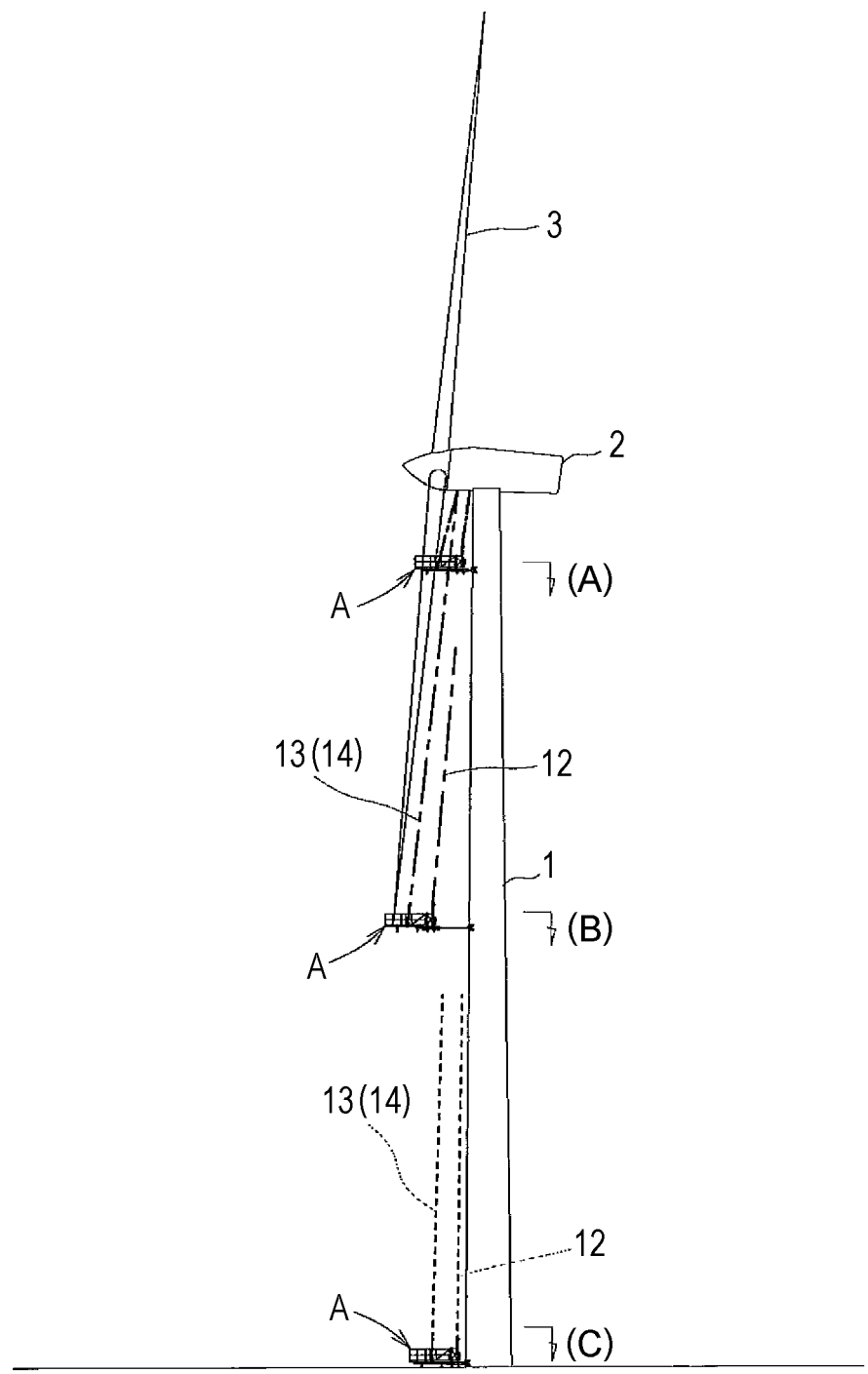
FIG. 5 is a front view of the disposition of the gondola apparatus according to the present invention, attached to an aerogenerator.

That is, the gondola apparatus A raises scaffold frames 4, 5, and 6 suspended with three traction ropes 12, 13, and 14 suspended from the nacelle 2, respectively, with, for example, publicly known endless lifters on which the traction ropes 12, 13, and 14 are wound, from a ground position C to an intermediate position B or an upper position A, as illustrated in FIG. 5. For example, each time the scaffold frames 4, 5, and 6 are stopped, for example, at the intermediate position B or the upper position A, maintenance work of the outer circumferential surface of a blade 3 is performed, such as painting or repairing.

Figure 6:
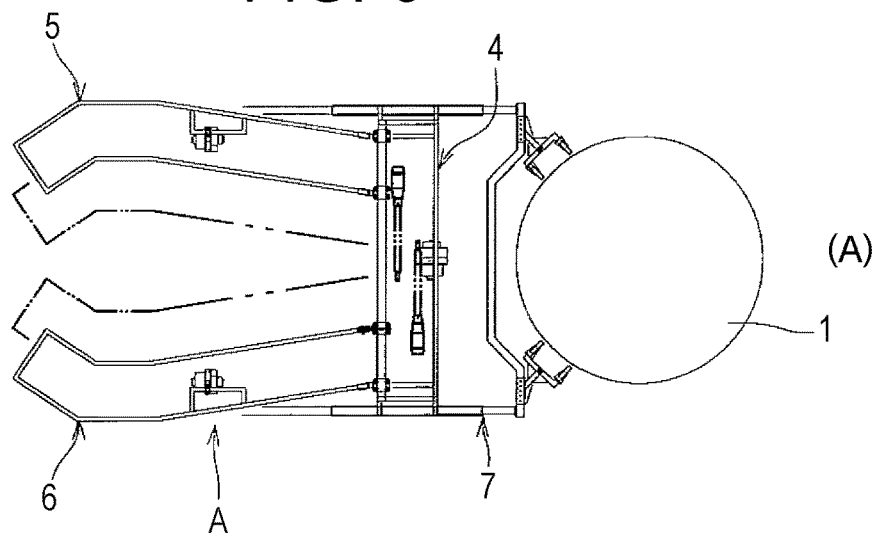
FIG. 6(A) is a plan view of the gondola apparatus disposed at a position of (A) of FIG. 5.
FIG. 6(B) is a plan view of the gondola apparatus disposed at a position of (B)
FIG. 6(C) is a plan view of the gondola apparatus disposed at a position of (C) of FIG. 5.
Figure 6:
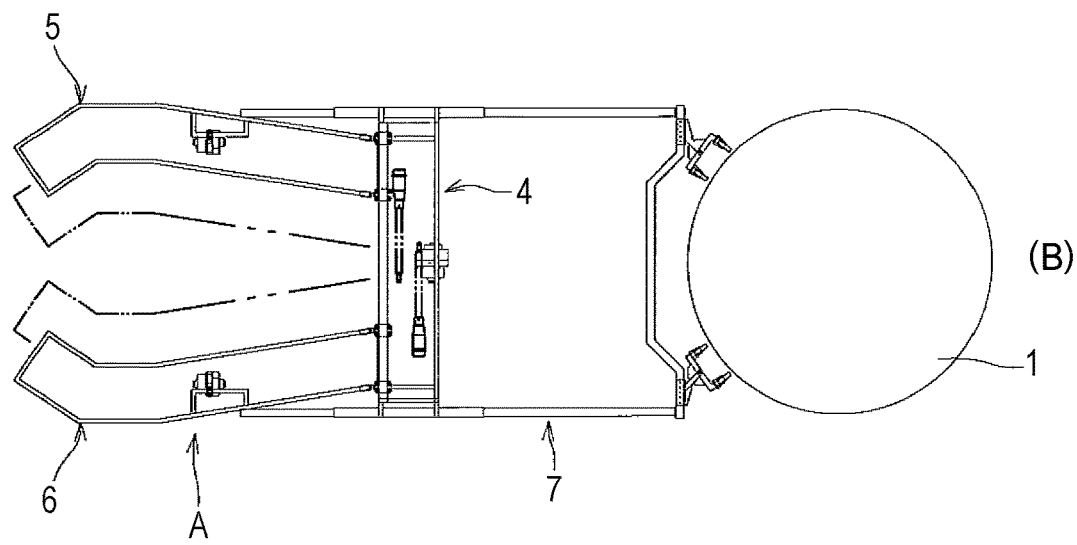
Figure 6:
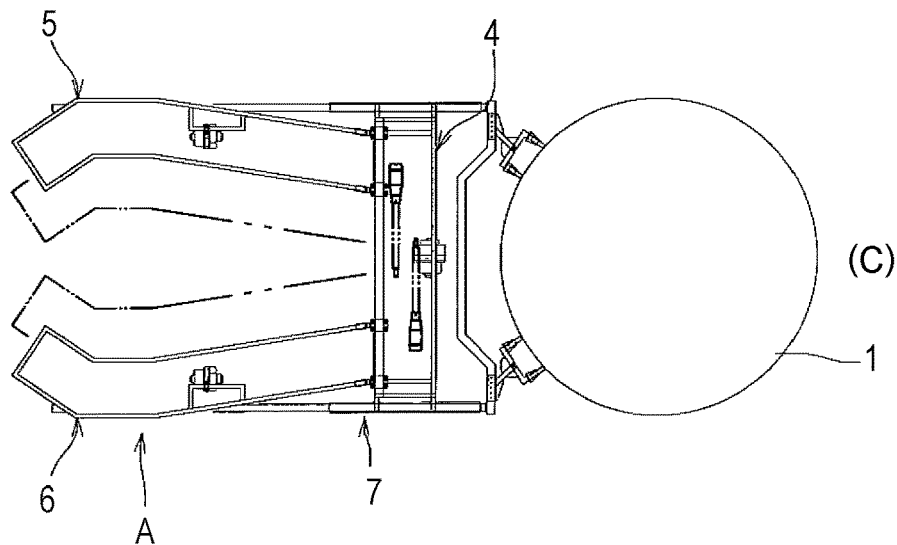

The gondola apparatus A includes a stabilizing member 7 extendable and contractable as to be described later. The stabilizing member 7 contracts and abuts on the outer surface of the tower 1 as illustrated in FIG. 6(C) when the gondola apparatus A is positioned on the ground C. The stabilizing member 7 extends to make the scaffold frames 4, 5, and 6 close to a work position in proximity to the narrow leading end of the blade 3 as illustrated in FIG. 6(B) at the intermediate position B. The stabilizing member 7 contracts again to make the scaffold frames 4, 5, and 6 close to the tower 1 as illustrated in FIG. 6(A) at the position A corresponding to a work position to a thick portion of the blade 3.

Figure 3:
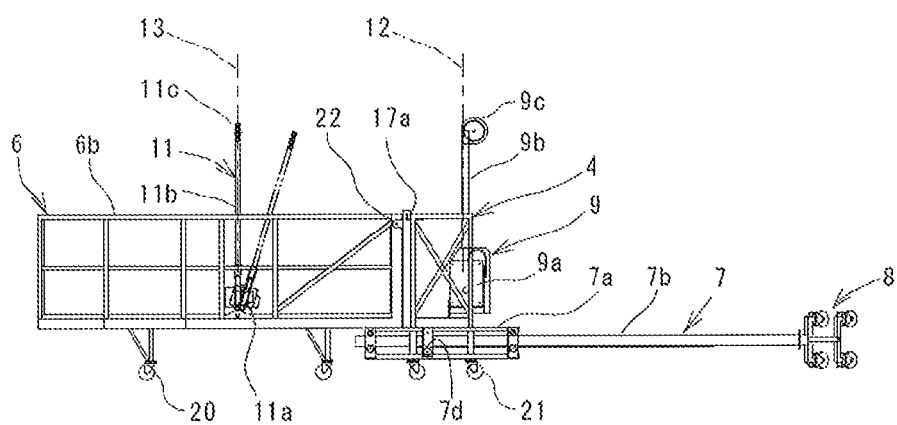
FIG. 3 is a front view of the gondola apparatus.
Figure 4:
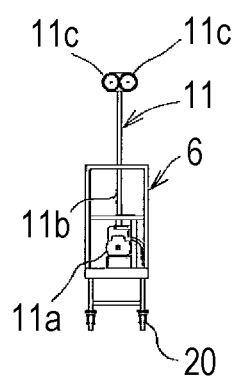
FIG. 4 is a partially left side view of FIG. 3.

In the descriptions of the gondola apparatus A, the longitudinal direction of the gondola apparatus A and each member included in the gondola apparatus A, is based on a front view of FIG. 3. Expression of the longitudinal direction indicates a direction penetrating through the plane in the front view illustrated in FIG. 3 even when a description is given with reference to a different figure.

Figure 1:
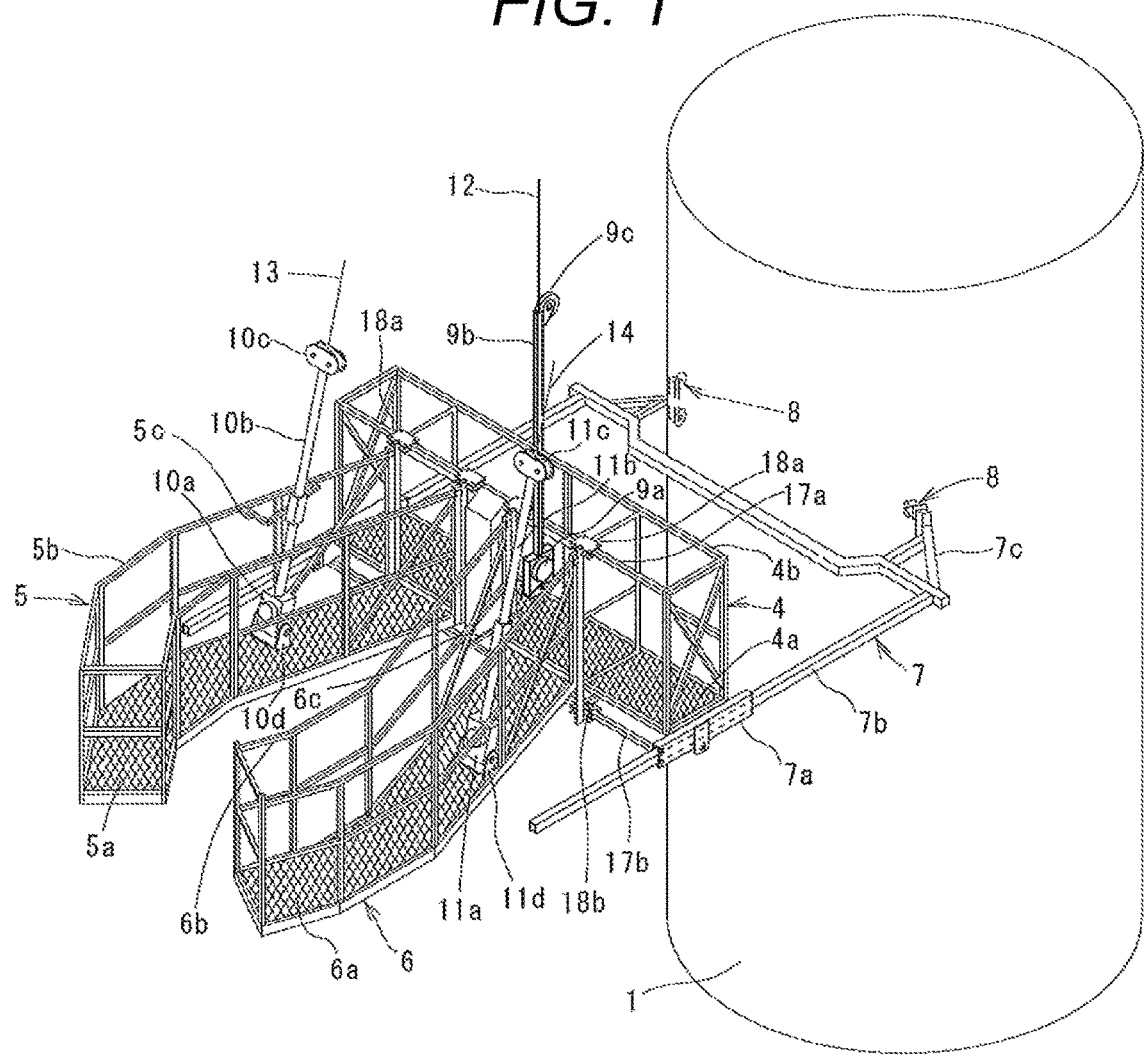
FIG. 1 is an entire perspective view of a gondola apparatus partially omitted according to the present invention.
Figure 2:
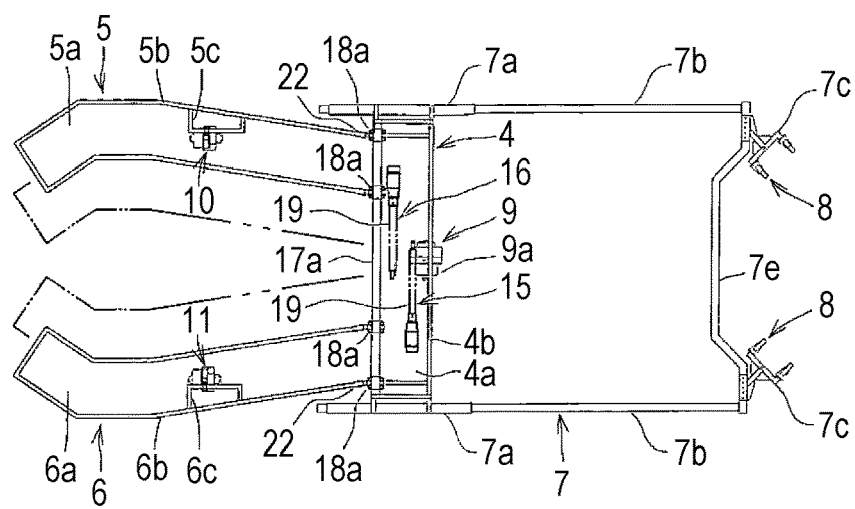
FIG. 2 is a plan view of the gondola apparatus according to the present invention.

As illustrated in FIGS. 1 and 2, the basic structure of the gondola apparatus A includes: the front scaffold frame 4 horizontally extending in the longitudinal direction, namely, in a direction crossing the tower 1, the front scaffold frame 4 facing the back on the tower side of the blade 3 of the aerogenerator; the paired first and second side scaffold frames 5 and 6 longitudinally movably attached to the front scaffold frame 4, each facing a side surface of the blade 3; the stabilizing member 7 attached over both lateral sides of the front scaffold frame 4 such that the stabilizing member 7 is extendable and contractable, the stabilizing member 7 abutting on the outer surface of the tower 1; a first lifting device 9 provided to the front scaffold frame 4; second and third lifting devices 10 and 11 attached to the paired side scaffold frames 5 and 6, respectively, such that the second and third lifting devices 10 and 11 are rockable; first and second drive devices 15 and 16 provided to the front scaffold frame 4, the first and second drive devices 15 and 16 being configured to horizontally drive the side scaffold frames 5 and 6, respectively; and the first, second, and third traction ropes 12, 13, and 14 provided between the first, second, and third lifting devices 9, 10, and 11, and the origin on the side of the nacelle 2, respectively.

The front scaffold frame 4 includes a scaffold board 4a and a handrail 4b circumferentially erecting on the scaffold board 4a. Similarly, the side scaffold frames 5 and 6 include scaffold boards 5a and 6a and handrails 5b and 6b circumferentially erecting on the scaffold boards 5a and 6a, respectively. The leading ends of the scaffold boards 5a and 6a and the leading ends of the handrails 5b and 6b bend toward the blade 3 as illustrated.

The first side scaffold frame 5 and the second side scaffold frame 6 have base ends coupled to the front scaffold frame 4 through the first and second drive devices 15 and 16, respectively, and additionally have the sides of the leading ends extending in a V shape from the base ends, each facing the side surface of the blade 3.

Figure 16:
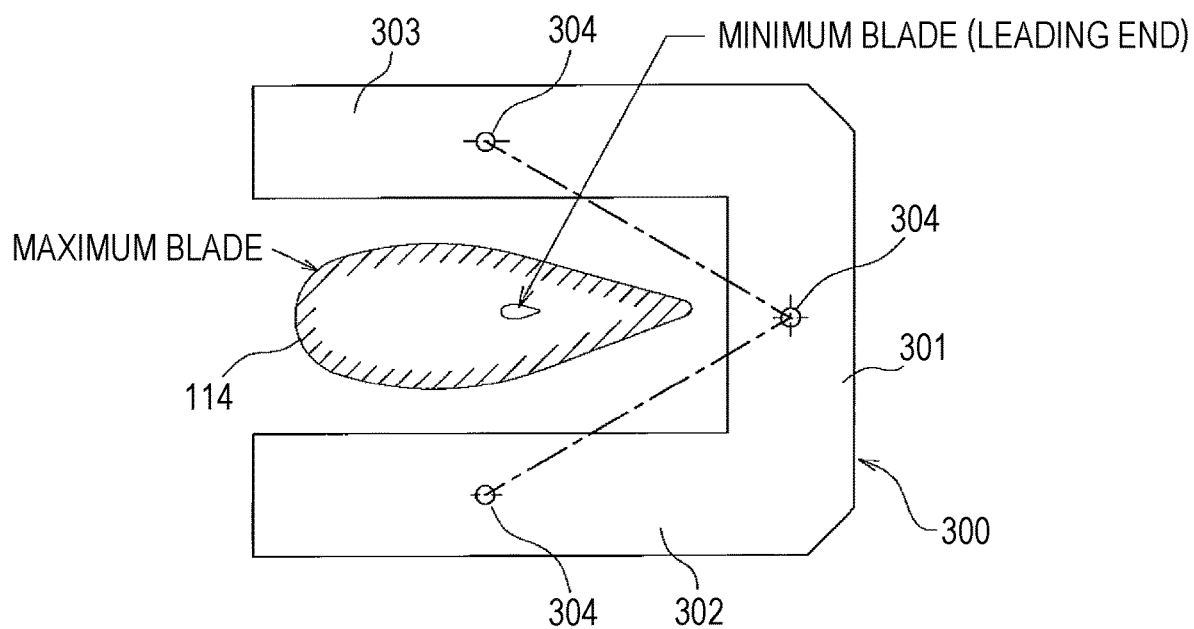
FIG. 16 is a simplified plan view of the other different conventional gondola apparatus illustrated in FIG. 15 disposed at the circumference of a blade.

Therefore, the lateral scaffold frames 5 and 6 can be made close to or away from the outer surface of the blade 3. Furthermore, when, for example, a sectionally teardrop-shaped blade 3 illustrated in FIG. 16 is handled, the lateral scaffold frames 5 and 6 can be disposed in accordance with a thick portion and a thin portion of the blade 3 in horizontal section view, and thus no positioning with, for example, an assist rope from the ground is required.

The first lifting device 9 includes: an endless first lifter 9a; a front prop 9b erecting upward from the housing of the first lifter 9a; and a sheave 9c provided at the upper end of the prop 9b, the sheave 9c guiding the first traction rope 12.

Similarly, the second and third lifting devices 10 and 11 include: endless second and third lifters 10a and 11a; side props 10b and 11b erecting upward from the housings of the lifters 10a and 11a; and laterally paired sheaves 10c and 11c provided at the upper ends of the side props 10b and 11b, the sheaves 10c and 11c guiding the second and third traction ropes 13 and 14, respectively.

Therefore, the traction ropes 12, 13, and 14 are pulled up along the props 9b, 10b, and 11b, respectively, so that the traction ropes 12, 13, and 14 are prevented from interfering with the handrails 4b, 5b, and 6b, respectively. In addition, a worker is prevented from being tangled with the traction ropes 12, 13, and 14 while walking. Thus, this arrangement is safe.

The traction ropes 12, 13, and 14 may be directly wound on the lifters 9a, 10a, and 11a, respectively, but the traction ropes 12, 13, and 14 are preferably pulled up through the props 9b, 10b, and 11b and the sheaves 9c, 10c, and 11c, respectively, since there is a risk that the traction ropes 12, 13, and 14 interfere with the handrails 4b, 5b, and 6b, respectively.

The lower ends of the second and third lifters 10a and 11a are coupled to the side scaffold frames 5 and 6 through brackets 10d and 11d with pins, respectively, such that the lower ends of the second and third lifters 10a and 11a are rockable. Note that, the second and third lifters 10a and 11a may be each a winding-type lifter. The lower ends of the lifters 10a and 11a may be coupled to the side scaffold frames 5 and 6 through universal joints, respectively.

Figure 10:
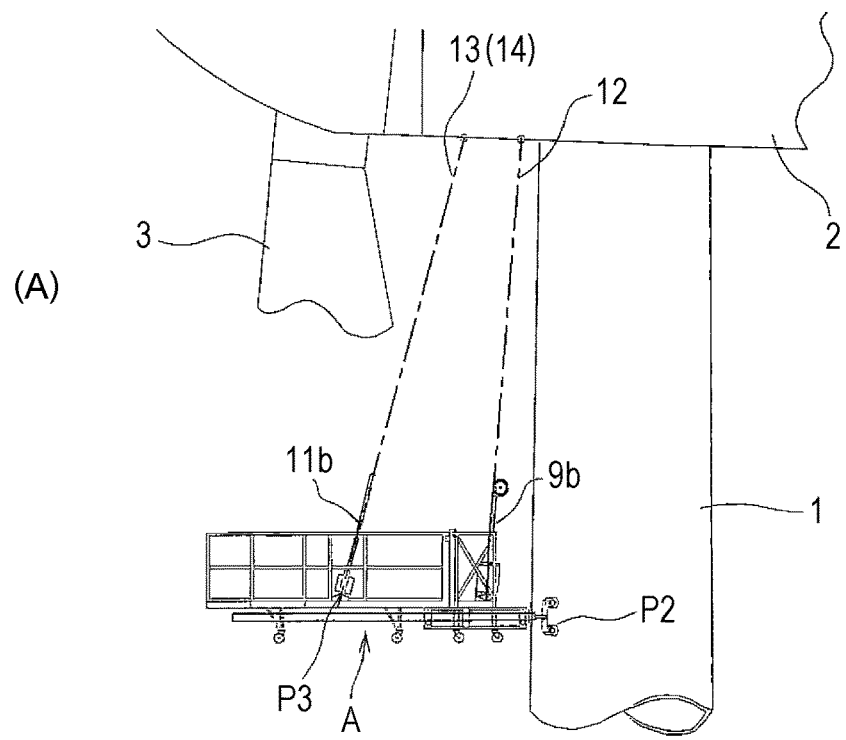
FIG. 10(A) is a front view of side second and third lifting devices that have been rockable.
FIG. 10(B) is a front view of the side second and third lifting devices that have been fixed.
Figure 10:
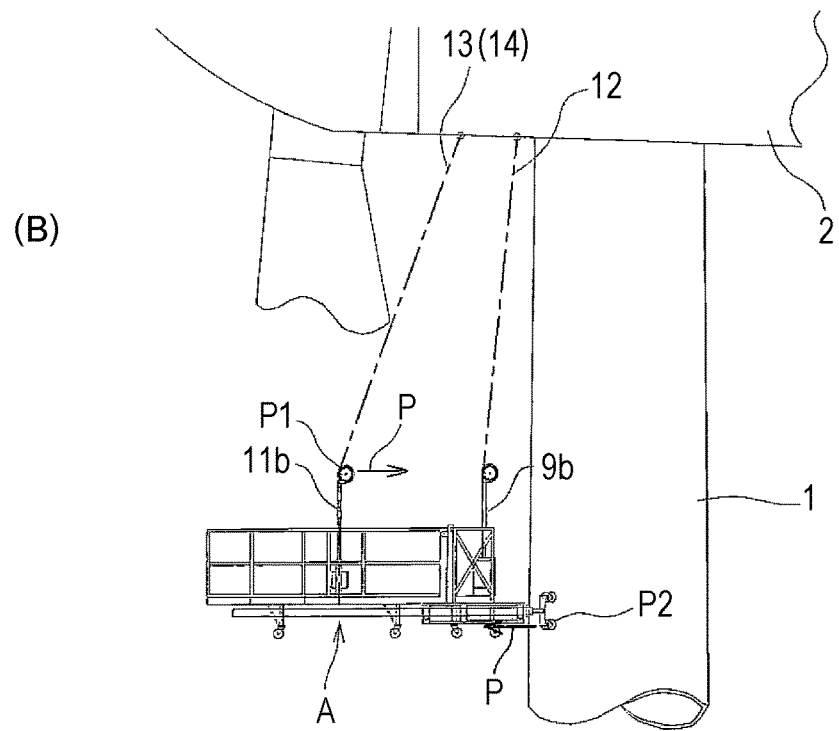
Figure 11:
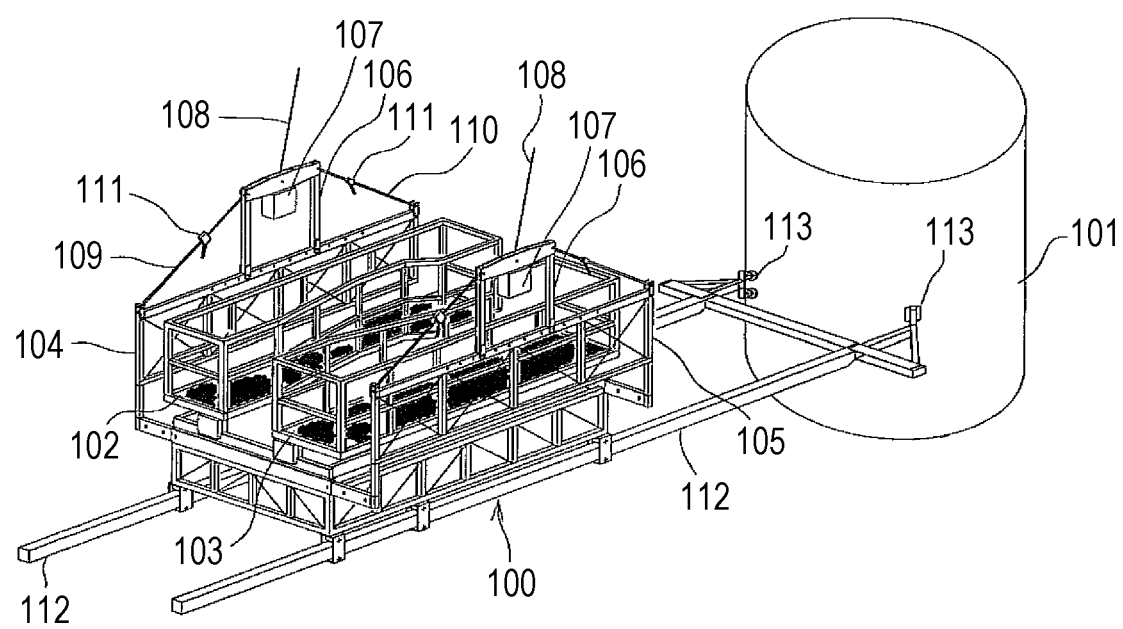
FIG. 11 is a perspective view of a conventional gondola apparatus.
Figure 12:
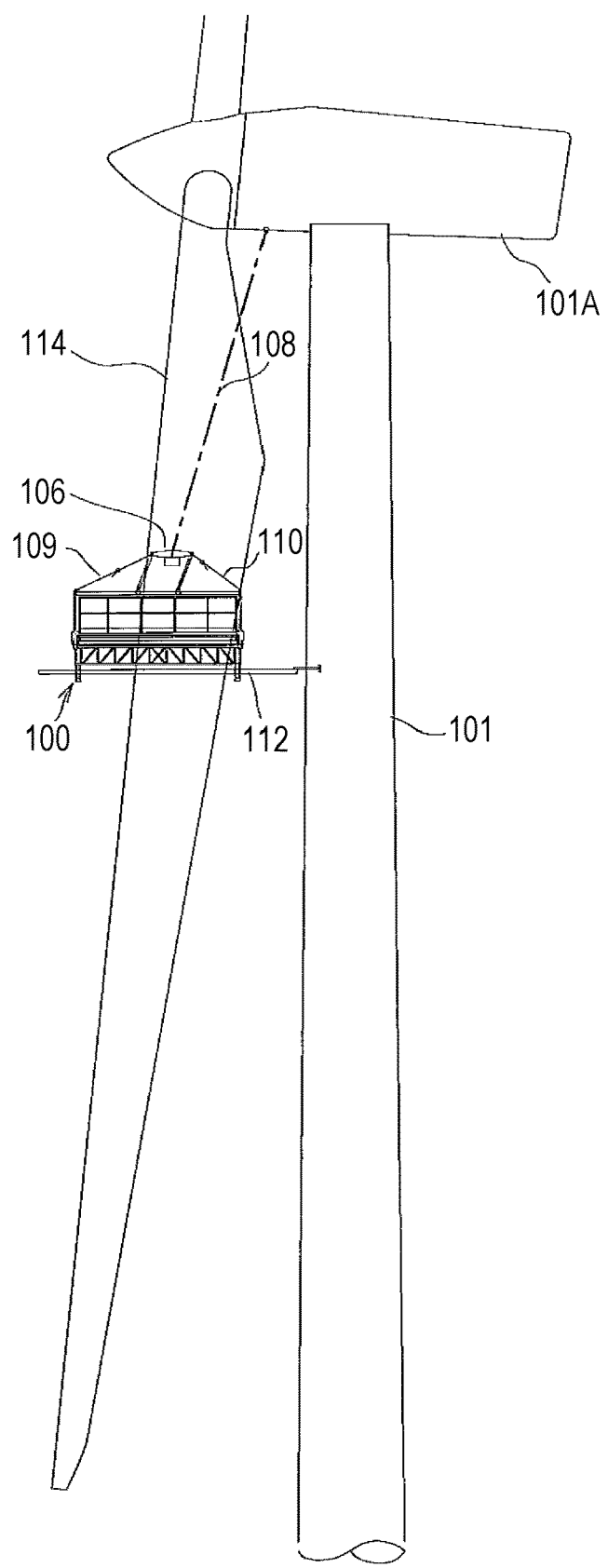
FIG. 12 is a front view of the conventional gondola apparatus illustrated in FIG. 11 disposed at an aerogenerator.
Figure 13:
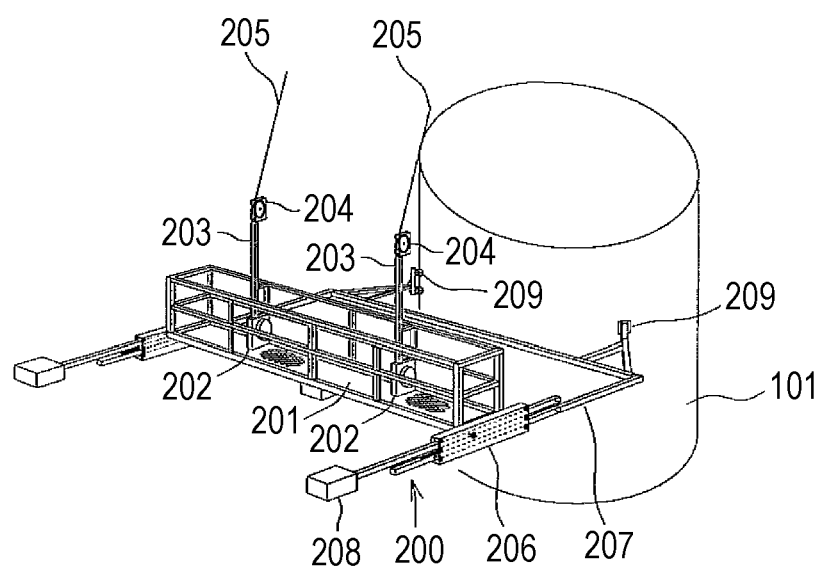
FIG. 13 is a perspective view of another conventional gondola apparatus.
Figure 14:
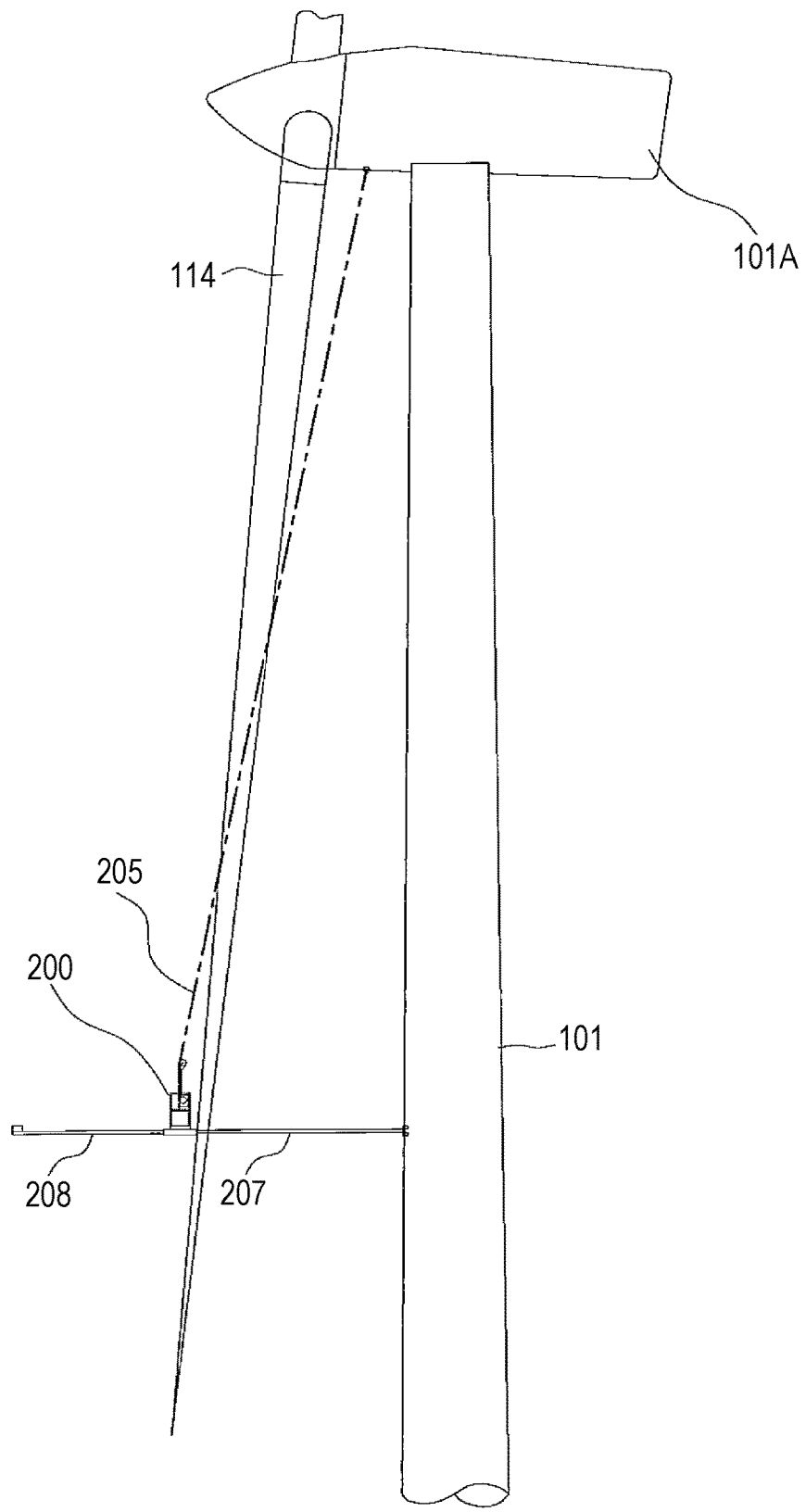
FIG. 14 is a front view of the other conventional gondola apparatus illustrated in FIG. 13 disposed at an aerogenerator.

The lifting devices according to the present invention are rockable, but the lifting devices perpendicularly erecting with the base ends of the lifters 10a and 11a fixed and the side props 10b and 11b fixed, can be adopted, as illustrated in a reference example of FIG. 10(B).

Figure 15:
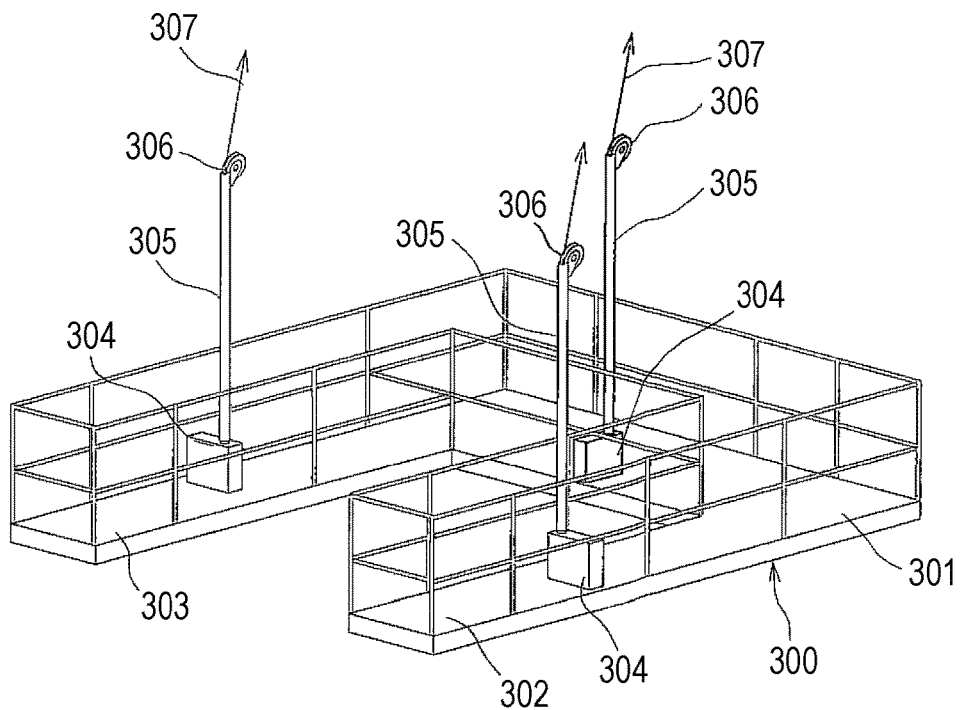
FIG. 15 is a perspective view of still another conventional gondola apparatus.

That is, the gondola apparatus of FIG. 10(B) corresponding to a conventional type illustrated in FIG. 15 can be adopted. However, with the lifting devices each having this type of fixed structure, horizontally parallel inverse force P acts on sheave portions P1 and roller portions P2 when the second and third traction ropes 13 and 14 incline as illustrated in FIG. 10(B).

Since the difference in altitude by the length of each of the side props 10b and 11b is present between P1 and P2 being each a point of application, a moment of rotating the gondola apparatus A clockwise occurs, so that tensile force against the moment is applied to the first traction rope 12. Therefore, it is necessary to use a high-rigidity traction rope 12 that bears the moment, and additionally the durability thereof deteriorates.

In contrast to this, the gondola apparatus according to the embodiment of the present invention has the entire second and third lifting devices 10 and 11 rockable through the pins provided to the brackets 10d and 11d, respectively, as illustrated in FIGS. 1 and 10(A). In other words, since the lifters 10a and 11a and the side props 10b and 11b rock respectively, pin portions P3 each act as a point of application and these positions are lower than each point of application P1 of FIG. 10(B).

Therefore, since the difference in altitude between P2 and P3 being each a point of application, is smaller than that in FIG. 10(B), the rotation moment acting on the gondola apparatus A can be reduced. Thus, the first traction rope 12 of the front scaffold frame 4 can be prevented from being overloaded and the durability thereof can be prevented from deteriorating, so that the first traction rope 12 can be formed of a small-rigidity material.

In addition, since the side props 10b and 11b rock and incline as illustrated in 10(A), loads acting thereon can be reduced, damage thereof can be prevented, and durability can improve.

Figure 9:
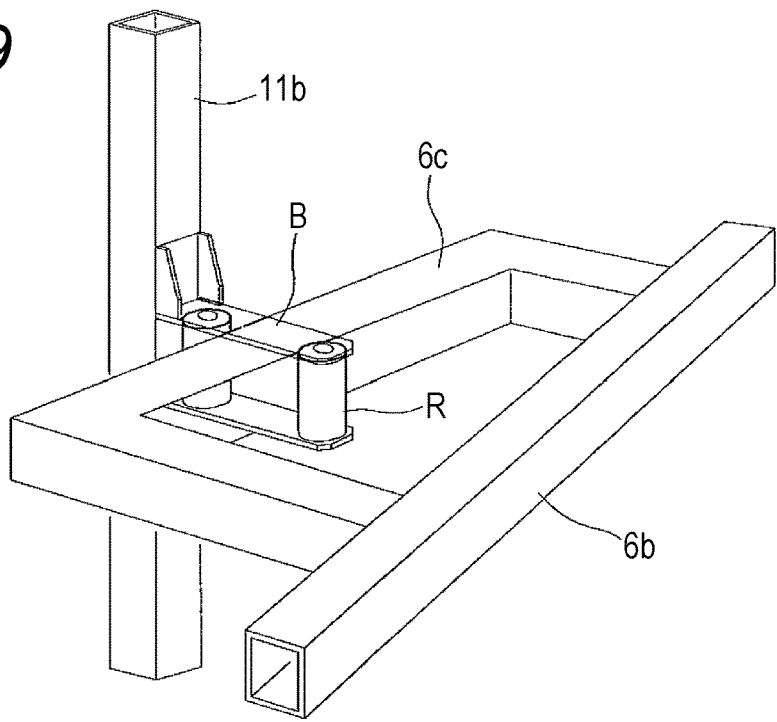
FIG. 9 is a perspective view of a guide mechanism of a side prop.

Note that, as illustrated in FIG. 9, guide frames 5c and 6c are provided inside the handrails 5b and 6b of the first and second side scaffold frames 5 and 6, respectively. A roller R is provided to each of the side props 10b and 11b through a bracket B. The guide frames 5c and 6c guide the rock of the side props 10b and 11b through the rollers R, respectively, so that the props 10b and 11b are stabilized and interference with the worker is also prevented.

Next, the first drive device 15 includes: vertically paired horizontal guide props 17a and 17b provided to the front scaffold frame 4; vertically paired guide rollers 18a and 18b attached to the base end of the first side scaffold frame 5 through a bracket 22, the vertically paired guide rollers 18a and 18b being slidably inserted into the guide props 17a and 17b, respectively; and a cylinder 19 provided between the lower guide roller 18b and the front scaffold frame 4. The second drive device 16 includes: the vertically paired horizontal guide props 17a and 17b provided to the front scaffold frame 4; vertically paired guide rollers 18a and 18b attached to the base end of the second side scaffold frame 6 through a bracket 22, the vertically paired guide rollers 18a and 18b being slidably inserted into the guide props 17a and 17b, respectively; and a cylinder 19 provided between the lower guide roller 18b and the front scaffold frame 4, the cylinder 19 being paired with the cylinder 19 of the first drive device 15.

Figure 7:
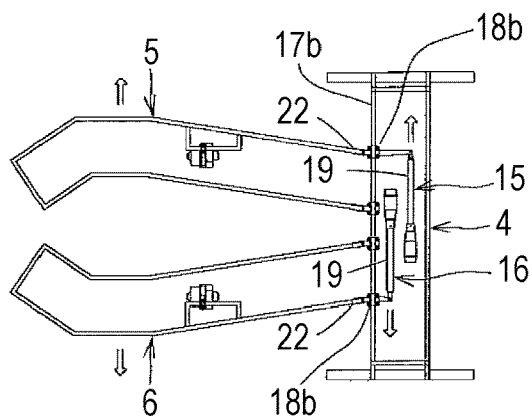
FIG. 7 is a plan view of a drive device.

As illustrated in FIG. 7, when the cylinders 19 and 19 extend or contract, the first and second side scaffold frames 5 and 6 each move horizontally to the front scaffold frame 4 along the guide props 17a and 17b through the guide rollers 18a and 18b. In this manner, since the first side scaffold frame 5 and the second side scaffold frame 6 are attached to the front scaffold frame 4 such that the first side scaffold frame 5 and the second side scaffold frame 6 are horizontally movable, the first and second side scaffold frames 5 and 6 are made close or away in accordance with the thickness of the blade 3, so that the work position can be adjusted.

The stabilizing member 7 includes: paired guide pipes 7a provided on both longitudinal sides of the front scaffold frame 4; a rack 7b inserted into each of the guide pipes 7a such that the rack 7b is extendable and contractable, the rack 7b being to be driven with a pinion 7d; a rockable bracket 7c provided to an end portion of the rack 7b; and a roller 8 provided to each of the brackets 7c and 7c, the roller 8 abutting on the outer surface of the tower 1 such that the roller 8 is rollable.

Figure 8:
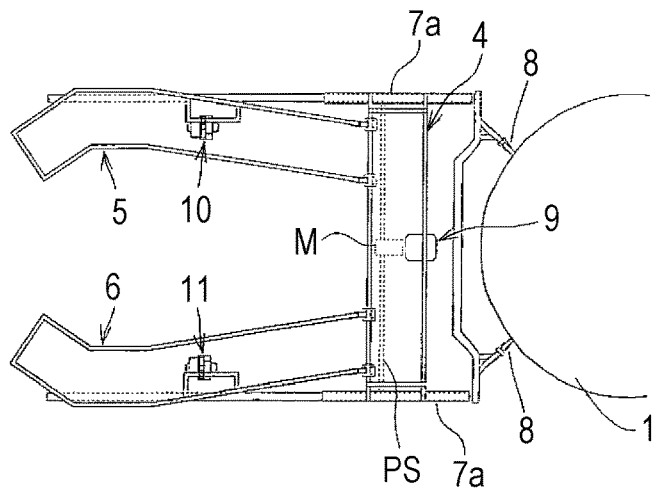
FIG. 8 is a plan view of a stabilizer and a drive unit thereof.

The pinion 7d is rotationally driven by a motor M provided to the front scaffold frame 4 and a propeller shaft PS rotationally driven by the motor M, as illustrated in FIG. 8.

Thus, drive of the motor M can operate the stabilizing member 7 to extend or contract, and improve operability. The drive of the motor M allows the stabilizing member 7 to extend toward or contract against the tower 1, so that the scaffold frames 4, 5, and 6 can be moved to an optimum position for the maintenance of the blade 3. The roller 8 is coupled to the rack 7b through the bracket 7c adjustable in horizontal angle. Note that, the number of rollers 8 to be provided can be arbitrarily changed in design.

The bracket 7c is coupled to an arm 7e provided to the end portion of the rack 7b, through a bolt or a pin such that the bracket 7c is adjustable in position. Therefore, change of the attached position can adjust the position of the roller 8 in accordance with various outer diameters of the tower 1 of the aerogenerator.

A plurality of casters 20 is provided to each of lower portions of the side scaffold frames 5 and 6, and a plurality of casters 21 is provided to each of lower portions of the guide pipes 7a. The gondola apparatus A itself can be moved to a predetermined position with the casters 20 and 21.

According to the present invention, the following effects can be achieved.

1) There are provided: the front scaffold frame 4 horizontally extending in the direction crossing the tower 1, the front scaffold frame 4 facing the back of the blade 3; and the second and third side scaffold frames 5 and 6 horizontally movably attached to the front scaffold frame 4, each facing the side surface of the blade 3. Thus, the scaffold frames 4, 5, and 6 can be disposed over the entire circumferential region of the blade 3.

2) The stabilizing member 7 is attached over both sides of the front scaffold frame 4 such that the stabilizing member 7 is extendable and contractable to the tower 1, the stabilizing member 7 abutting on the outer surface of the tower 1. Thus, the scaffold frames 4, 5, and 6 can be raised or lowered along the tower 1, prevented from joggling.

3) The first, second, and third traction ropes 12, 13, and 14 are suspended between the first, second, and third lifting devices 9, 10, and 11 and the origin on the side of the nacelle. Thus, the scaffold frames 4, 5, and 6 are uniformly suspended with the three traction ropes 12, 13, and 14, respectively, and are horizontally stably maintained. Thus, no device that horizontally maintains each of the scaffold frames 4, 5, and 6 and no operation thereof are required.

4) The second and third lifting devices 10 and 11 are attached to the side scaffold frames 5 and 6, respectively, such that the second and third lifting devices 10 and 11 are rockable. Even when the side second and third traction ropes 13 and 14 cause horizontal force to act on the second and third lifting devices 10 and 11 and then a couple of forces causes a rotation moment to act on the entire gondola apparatus, the second and third lifting devices 10 and 11 rock and lower points of application of the second and third traction ropes 13 and 14 to the lifting devices 10 and 11, to allow the rotation moment to be reduced. Thus, the front first traction rope 12 can be prevented from being overloaded or the overload can be reduced, and the durability can be prevented from deteriorating. As a result, the front first traction rope 12 can be formed of a small-rigidity material.

5) Since the first and second drive devices 15 and 16 that horizontally drive the side scaffold frames 5 and 6, respectively, are provided, the side scaffold frames 5 and 6 can be made close or away along the outer surface of the blade 3. Thus, the side scaffold frames 5 and 6 can be disposed in accordance with the teardrop sectional shape of the blade 3. Thus, no assist rope for approach to the blade 3 and no operation work thereof are required.

Furthermore, when the base ends of the side scaffold frames 5 and 6 move to the center of the front scaffold frame 4, movable loads disappear on both end portions of the front scaffold frame 4, so that the entire gondola apparatus is prevented from joggling or inclining.

The preferred embodiment of the present invention has been described above, but additions, modifications, and alterations may be made without departing from the scope of the claims.

The invention claimed is:

1. A gondola apparatus to be used for maintenance of a blade in an aerogenerator including a columnar tower, a nacelle provided on the tower, and the blade rotatably attached to the nacelle, the aerogenerator being configured to rotate the blade to operate a generator, the gondola apparatus comprising:
a front scaffold frame horizontally extending in a direction crossing the tower, the front scaffold frame being configured to face a back of the blade, and the front scaffold frame having a first lateral side and a second lateral side;
a first side scaffold frame horizontally movably attached to the front scaffold frame, the first side scaffold frame being configured to face one side surface of the blade;
a second side scaffold frame horizontally movably attached to the front scaffold frame, the second side scaffold frame being configured to face an other side surface of the blade;
a stabilizing member attached over both the first lateral side and the second lateral side of the front scaffold frame such that the stabilizing member is extendable and contractable to the tower, the stabilizing member abutting on an outer surface of the tower;
a first lifting device attached to the front scaffold frame;
a second lifting device attached to the first side scaffold frame such that the second lifting device is rockable with respect to the first side scaffold frame;
a third lifting device attached to the second side scaffold frame such that the third lifting device is rockable with respect to the second side scaffold frame;
a first drive device attached to the front scaffold frame, the first drive device being configured to horizontally drive the first side scaffold frame;
a second drive device attached to the front scaffold frame, the second drive device being configured to horizontally drive the second side scaffold frame;
a first traction rope wound on the first lifting device and configured to be connected at one end to an origin on a side of the nacelle;
a second traction rope wound on the second lifting device and configured to be connected at one end to the origin on the side of the nacelle; and
a third traction rope wound on the third lifting device and configured to be connected at one end to the origin on the side of the nacelle
a first handrail provided on the first side scaffold frame;
a second handrail provided on the second side scaffold frame;
a first guide frame provided onto the first handrail; and
a second guide frame provided onto the second handrail,
wherein the second lifting device includes a first side prop, the third lifting device includes a second side prop, a rocking motion of the first side prop is guided by the first guide frame, and a rocking motion of the second side prop is guided by the second guide frame.

2. The gondola apparatus according to claim 1, wherein the first side scaffold frame and the second side scaffold frame are each configured in a V shape and attached to the front scaffold frame.

3. The gondola apparatus according to claim 1, wherein the front scaffold frame includes a scaffold board and a handrail circumferentially erecting on the scaffold board,
the first side scaffold frame and the second side scaffold frame each include a respective scaffold board and a handrail circumferentially erecting on the respective scaffold board of the first side scaffold frame and the second side scaffold frame,
the first side scaffold frame has a base end on the front scaffold frame side coupled to the front scaffold frame through the first drive device and has a side of a leading end on the opposite side of the front scaffold frame extending in a V shape from the base end of the first side scaffold frame, the side of the leading end facing the one side surface of the blade, and
the second side scaffold frame has a base end on the front scaffold frame side coupled to the front scaffold frame through the second drive device and has a side of a leading end on the opposite side of the front scaffold frame extending in a V shape from the base end of the second side scaffold frame, the side of the leading end facing an other side surface of the blade.

4. The gondola apparatus according to claim 1, wherein the first lifting device includes: an endless first lifter; a front prop erecting upward from a housing of the first lifter; and a sheave provided at an upper end of the front prop, the sheave of the first lifting device guiding the first traction rope, the second lifting device includes: an endless second lifter; the first side prop erecting upward from a housing of the second lifter; and a sheave provided at an upper end of the first side prop, the sheave of the second lifting device guiding the second traction rope, the third lifting device includes: an endless third lifter; the second side prop erecting upward from a housing of the third lifter; and a sheave provided at an upper end of the second side prop, the sheave of the third lifting device guiding the third traction rope, the sheave of the third lifting device being laterally paired with the sheave of the second lifting device, a lower end of the second lifter is coupled to the first side scaffold frame through a bracket or a universal joint such that the lower end of the second lifter is rockable, and a lower end of the third lifter is coupled to the second side scaffold frame through a bracket or a universal joint such that the lower end of the third lifter is rockable.

5. The gondola apparatus according to claim 4, wherein the first side scaffold frame and the second side scaffold frame each include a respective scaffold board and a respective one of the first and second handrails circumferentially erected on the respective scaffold board of the first side scaffold frame and the second side scaffold frame, the first guide frame is attached to the first handrail of the first side scaffold frame, a first roller is attached to the first side prop such that the first roller is arranged between the first guide frame and the first handrail of the first side scaffold frame, the second guide frame is attached to the second handrail of the second side scaffold frame, a second roller is attached to the second side prop such that the second roller is arranged between the second guide frame and the second handrail of the second side scaffold frame.

6. The gondola apparatus according to claim 1, wherein the first drive device includes: vertically paired horizontal guide props attached to the front scaffold frame; vertically paired first guide rollers attached to a base end of the first side scaffold frame through a bracket, the vertically paired first guide rollers being slidably inserted into the respective guide props; and a cylinder provided between a lower first guide roller from the vertically paired first guide rollers and the front scaffold frame, and the second drive device includes: the vertically paired horizontal guide props attached to the front scaffold frame; vertically paired guide second rollers attached to a base end of the second side scaffold frame through a bracket, the vertically paired second guide rollers being slidably inserted into the respective guide props; and a cylinder provided between a lower second guide roller from the vertically paired second guide rollers and the front scaffold frame.

7. The gondola apparatus according to claim 1, wherein the stabilizing member includes: paired guide pipes provided on both of the sides of the front scaffold frame; a rack inserted into each of the guide pipes such that the rack is extendable and contractable, the rack being driven with a pinion; a rockable bracket provided to an end portion of the rack; and a roller provided to each bracket, the roller abutting on the outer surface of the tower such that the roller is rollable, and the pinion is rotationally driven by a motor provided on the front scaffold frame and a propeller shaft rotationally driven by the motor.

* * * * *